United States Patent
Deshmukh et al.

(10) Patent No.: US 10,400,701 B2
(45) Date of Patent: Sep. 3, 2019

(54) MULTIPLE MODE CONTROL SYSTEM FOR A VEHICLE

(71) Applicant: MAHINDRA & MAHINDRA LIMITED, Mumbai (IN)

(72) Inventors: Milind Vilas Deshmukh, Pune (IN); Jacob David Raj, Chennai (IN); Amol Arun Relkar, Pune (IN); Sanjiv Kashinath Khetmar, Pune (IN); Vishal Dudhankar, Pune (IN); Sachin Bhalchandra Kulkarni, Pune (IN); Devising Sadashiv Rathod, Pune (IN)

(73) Assignee: MAHINDRA AND MAHINDRA LIMITED, Mumbai (IN)

( * ) Notice: Subject to any disclaimer, the term of this patent is extended or adjusted under 35 U.S.C. 154(b) by 52 days.

(21) Appl. No.: 15/113,571

(22) PCT Filed: Jan. 23, 2015

(86) PCT No.: PCT/IN2015/000047
§ 371 (c)(1),
(2) Date: Jul. 22, 2016

(87) PCT Pub. No.: WO2015/111083
PCT Pub. Date: Jul. 30, 2015

(65) Prior Publication Data
US 2017/0009694 A1   Jan. 12, 2017

(30) Foreign Application Priority Data

Jan. 23, 2014 (IN) .......................... 246/MUM/2014

(51) Int. Cl.
*F02D 41/26* (2006.01)
*G05D 1/02* (2006.01)
(Continued)

(52) U.S. Cl.
CPC ....... *F02D 41/263* (2013.01); *F02D 41/2422* (2013.01); *F02D 41/3011* (2013.01);
(Continued)

(58) Field of Classification Search
CPC .............. F02D 41/263; F02D 41/2422; F02D 41/3011; F02D 2200/602; F02D 2200/701;
(Continued)

(56) References Cited

U.S. PATENT DOCUMENTS 5,445,128 A * 8/1995 Letang ................. B60K 31/045
123/436
6,178,947 B1 * 1/2001 Machida ............... F02D 11/106
123/396

(Continued)

FOREIGN PATENT DOCUMENTS

KR  20130011291 A   1/2013
WO  2015111803 A1   7/2015

OTHER PUBLICATIONS

Multiple Mode Control System for a Vehicle, International Search Report, Jun. 30, 2015, pp. 1 to 3, WIPO, Indian Patent Office, India.
(Continued)

*Primary Examiner* — Jelani A Smith
*Assistant Examiner* — Majda Alsomiri
(74) *Attorney, Agent, or Firm* — Mannava & Kang, P.C.; Vinay Malik (57) ABSTRACT

Multiple mode control system for a vehicle includes a vehicle control unit operatively configured with manual override switch, one or plurality of sensors, audio output means and electronic control unit (ECU). The vehicle control unit includes processor configured with Read Only Memory, random access memory, analog to digital converter, switch driver and an optional communication engine
(Continued)

and hard disk drive. The engine of the vehicle is configured with electronic control unit.

5 Claims, 6 Drawing Sheets

(51) Int. Cl.
*G05D 1/00* (2006.01)
*F02D 41/24* (2006.01)
*F02D 41/30* (2006.01)

(52) U.S. Cl.
CPC ......... *G05D 1/0061* (2013.01); *G05D 1/0088* (2013.01); *G05D 1/0274* (2013.01); *G05D 1/0278* (2013.01); *F02D 2200/023* (2013.01); *F02D 2200/024* (2013.01); *F02D 2200/063* (2013.01); *F02D 2200/0606* (2013.01); *F02D 2200/1002* (2013.01); *F02D 2200/501* (2013.01); *F02D 2200/602* (2013.01); *F02D 2200/604* (2013.01); *F02D 2200/606* (2013.01); *F02D 2200/701* (2013.01); *F02D 2200/702* (2013.01); *F02N 2200/124* (2013.01)

(58) Field of Classification Search
CPC ....... F02D 2200/024; F02D 2200/0606; F02D 2200/063; F02D 2200/1002; F02D 2200/501; F02D 2200/023; F02D 2200/702; F02D 2200/606; F02D 2200/604; G05D 1/0061; G05D 1/0278; G05D 1/0088; G05D 1/0274; F02N 2200/124

See application file for complete search history.

(56) References Cited

U.S. PATENT DOCUMENTS

| | | | |
|---|---|---|---|
| 7,003,394 B2 | 2/2006 | Takahashi et al. | |
| 7,530,345 B1* | 5/2009 | Plante | B60K 31/00 123/361 |
| 2005/0171678 A1 | 8/2005 | Takahashi et al. | |
| 2007/0198145 A1* | 8/2007 | Norris | B60T 7/22 701/23 |
| 2012/0046817 A1* | 2/2012 | Kindo | B60W 30/143 701/23 |
| 2013/0024057 A1* | 1/2013 | Jung | B60W 20/00 701/22 |
| 2013/0261846 A1* | 10/2013 | McQuade | G06F 17/00 701/2 |
| 2013/0261907 A1* | 10/2013 | McQuade | F02D 41/2425 701/51 |
| 2015/0322912 A1* | 11/2015 | Takizawa | F02N 11/0837 701/65 |

OTHER PUBLICATIONS

Examiner, Multiple Mode Control System for a Vehicle, Written Opinion of the International Searching Authority, Jun. 30, 2015, p. 1 to p. 6, WIPO, Indian Patent Office, India.

* cited by examiner

MULTIPLE MODE CONTROL SYSTEM FOR A VEHICLE

CROSS REFERENCES TO RELATED APPLICATIONS

The present application is a national phase application of international application number PCT/IN2015/000047, filed on 23 Jan. 2015 which claims priority from, IN Application Number 246/MUM/2014, filed on 23 Jan. 2014, the disclosure of which is hereby incorporated by reference herein.

FIELD OF THE INVENTION

The present invention relates to an engine control system for enhanced fuel economy and vehicle performance. More particularly the present invention relates to a vehicle controller to enable judicious selection and further migration between multiple operating modes through Engine Control Unit of a vehicle for effective fuel economy and vehicle performance based on/as a function of maximum vehicle speed, acceleration, road gradient and drivability conditions of a vehicle for diverse load and/or drivability and/or other road conditions.

BACKGROUND OF THE INVENTION

Fuel economy of vehicles has been a thrust area of research in the global auto industry due to the depleting resources and rising fuel costs. It has been observed that drivers of vehicles use higher power than necessary under the road conditions and traffic. On the other hand it is desirable to drive vehicles based on automatically optimised fuel consumption related parameters appropriate to the road, load and environmental conditions to achieve enhanced fuel economy and vehicle performance.

Several examples in prior art have addressed such issues though with limited success.

JP H05 332236A discloses an invention that is related to the combination of engine power limitation through a switch which controls fuel injection timing map and an ignition timing map. It is to be appreciated that ignition timing is appropriate for spark ignited engines like petrol, LPG and CNG, where the throttle valve is used for controlling the air supplied to engine based on the demand. In specific terms, the invention in JP H05 332236A is related to two or more injection timing and ignition timing maps. The invention in JP H05 332236A does not provide automatic selection control in the operating mode. Further it does not provide inputs from the road gradient and load which is of immense significance in selection of the correct operating mode that impacts driveability performance and fuel consumption. The input response is only controlled through a switch and a driver's aggressive driving habit and over speeding of a vehicle cannot be restricted by the system in JP H05 332236A.

DE 10 2009 008 872 A1 discloses a method for controlling/limiting the acceleration of a vehicle. By actuating the accelerator, engine power is controlled by the engine control unit. To achieve this, different characteristics are stored in the engine control unit. The engine is mechanically connected to an automatic transmission, system controlled by a transmission control unit which is connected to the gear shifting lever. Operating modes of the gear transmission can be adjusted by the driver. In addition, a kick-down switch disposed at the limiting stop of the accelerator gets actuated with a complete pressing down of the accelerator. DE 10 2009 008 872 A1 does not provide automatic selection control of the operating mode. Specifically DE 10 2009 008 872 A1 is related to the combination of engine power limitation as well as automatic transmission shift strategy. It does not have provisions for inputs from the road gradient and load, the power limitation being removed by complete pressing down of the accelerator. Such a system has the limitation that it cannot control aggressive driving habit and over speeding of a vehicle.

EP 0110226 A2 relates to a fuel demand signal derived in accordance with selected one (A, B or C) of a plurality of functions each specifying a respective predetermined related between value of fuel command signal, corresponding to fuel flow rate, and accelerator pedal displacement. This also determines the corresponding optimum air flow rate and controls the opening of the throttle valve. The selection of the respective function defining the relationship of the accelerator pedal movement to actual fuel flow command made by the operator or driver via a selector switch provides the desired engine response characteristic. This allows the variation within a range from normal to either a faster or more conservative engine reaction. The invention in this patent is appropriate for spark ignited petrol, LPG and CNG engines. This invention does not provide automatic selection control of the selection mode with inputs from injection timing, rail pressure, road gradient which are crucial in determining correct operating mode that impacts the driveability performance and fuel economy of the vehicle.

JP03132370B2 discloses a device which has a target speed level setting unit that sets desired speed level based on detection signals from a vehicle speed detector and an engine load detector. A vehicle load degree which corresponds to the weight and inclination resistance of the vehicle is detected by a vehicle load degree calculator. The engine auxiliary brake operation is also determined by means of another detector. A speed change controller controls speed change level, shifting the target speed level to speed level which is one step lower when the computed vehicle load degree is below a predetermined value and when operating the engine auxiliary brake. It achieves enough braking force which suits driver intention especially when traversing a downhill road. JP03132370B2 is therefore related to deceleration control of a vehicle on downhill. There is no provision of the multiple operating modes.

U.S. Pat. No. 7,003,394B2 describes an engine controller that controls injection quantity or intake airflow supplied to a cylinder of an engine using vehicle level sensors and determining the demanded torque from driver. A fairly complex algorithm is used to arrive at the target acceleration resistance based on the target acceleration and the vehicle weight. Air resistance and rolling resistance are added to the acceleration resistance to determine the running resistance for accelerating or decelerating the vehicle at the target acceleration. The driving wheel torque is determined using the running resistance and a constant based on the effective tire radius. The engine output shaft torque equivalent to a driver requested torque is determined using the driving wheel torque and a constant based on the final gear ratio. There is no provision for the use of multiple map operating modes.

U.S. Pat. No. 7,967,724B2 is primarily related to two wheeler type applications describes plurality of shift maps for deriving shift timing of an automatic transmission, and a controller for selecting one shift map of said plurality of shift maps according to output signals from said plurality of load sensors, and controls the shift timing of the automatic transmission according to the selected one shift mode. The Controller switches the Shift map of a standard type to an output-emphasizing type Shift map based on the total value of loaded weight sensed by the load sensors than the predetermined time. The system has no provision for inputs from road gradient and therefore suffers from severe limitations in ensuring enhanced driveability performance and fuel economy.

U.S. Pat. No. 8,311,722B2 describes an active driver control system. Additionally, in various example embodiments, this technology provides methods for optimizing fuel economy (or energy consumption) through active compensation of driver controlled inputs. The Active Compensation functionality is used to moderate 'sweet spot' vehicle response with driver desired performance. In particular, the active compensation functionality can be used to smooth the vehicle response and attenuate undesired frequency content from the driver input. The system is not fail safe, has no active control or audio command to driver while driving. Further, the driver may neglect the rating provided by "Green driving index" and continue to over-speed US 20080006711A1 relates to auxiliary engine drive control based on the demand mode of economy or normal mode. It is controlled by a demand switch for fuel economy with various blower speed control maps using inputs of coolant temperature sensor. When the economy switch signal is ON to instruct that fuel economy should be given priority, a blower of an air conditioning device is operated using a blower characteristic map for fuel economy so that a blower level of the air conditioning device is changed with respect to the change in an engine coolant temperature at a low rate. The system is not provided with any provision to control the ECU for activation of operational modes dependent on engine torque curve, injection quantity, timing and rail pressure that are crucial in the determination of driveability performance and fuel economy benefits.

PCT Application no. PCT/IN2013/000349 describes an invention related to a common rail electronically controlled vehicle provided with operation selection mode wherein the user can select either of the power mode and the economy mode of vehicle operation depending on the road and load conditions. The system neither provides for automatic selection control of the operating mode nor does it provide inputs in terms of road gradient and load to the ECU which are key determinants in the selection of the appropriate operating mode for the best fuel efficiency and driveability performance. The input response is controlled through a switch and a driver's aggressive driving habit and over speeding of a vehicle cannot be restricted by such a system. It uses only one set of Rail pressure, injection quantity & injection timing parameters for all modes.

There remains an unmet need to provide modes selected switching control for vehicle that is capable of optimizing the operating conditions based on load and gradient sensed inputs to the vehicle for the best mode of operation that would result in enhanced fuel economy and vehicle performance.

The challenge therefore lies in providing a comprehensive system involving the engine and vehicle power-train configuration that would be valid for multiple applications [e.g. high power applications, load applications, one side empty applications, under-load applications, better turnaround time applications, and their combinations depended on market demand] with best fuel economy and drivability performance.

OBJECTS OF THE INVENTION

The main object of the invention is to provide a vehicle controller system that enables Electronic Control Unit (ECU) to select of a particular operating mode that is arrived at based on the vehicle load, driving conditions and gradient wherein each of the particular operating mode corresponds to a defined values of the rail pressure, fuel injection quantity and injection timing to enhance fuel economy and vehicle performance irrespective of diverse and variable load, road and other driving conditions of the vehicle.

Another object of the invention is to provide a multiple mode control for vehicle with optimized modes of operation independent of each other, each mode determined by unique combination of rail pressure, injection quantity and injection timing.

Another object of the invention is to provide a multiple mode control for vehicle wherein the mode selection is done by load and gradient combination sensing as input to select the correct operating mode.

Another object of the invention is to provide a multiple mode control for vehicle with automated actuation/selection along with manual override control with given logic/permissions.

Another object of the invention is to provide a multiple mode control for vehicle wherein input to the vehicle controller with its embedded logic selects and controls appropriate mode of operation during a driving cycle.

Yet another object of the invention is to provide a multiple mode control for vehicle to prevent over acceleration of the vehicle by a driver.

Yet another object of the invention is to provide a multiple mode control for vehicle based on inputs from vehicle sensors and in built logic of the current state of vehicle operating mode and provide audio output to inform the driver to use the proper operating mode.

Yet another object of the invention is to provide a multiple mode control for vehicle that enables migration of the mode based on the driver input with specific system logic/permissions.

Another object of the invention is to enable migration between the modes by a process of switching, either automatic or manual in such a way that the transition time t' between the two modes can be varied so that the transition is seamless/smooth to avoid any abruptness or jerks.

Yet another object of the invention is to provide a multiple mode control for vehicle with auto selection of the previous mode of operation after ignition key ON-OFF cycle.

Yet another object of the invention is to provide a multiple mode control for vehicle with optimization options for individual limited torque curve to maximize fuel economy.

Yet another object of the invention is to provide a multiple mode control for vehicle with minimized vehicle power train variants in diverse applications, usage profiles, routes, and terrains.

Yet another object of the invention is to provide a multiple mode switching control for vehicle with a back-up of manual selection mode in case of sensor failure or failure of the automatic selection control unit.

Yet another object of the invention is to provide a multiple mode control for vehicle to provide user friendly interface tools and operating modes.

Thus in accordance with one of the aspects of the invention the vehicle controller system of the present invention enables Electronic Control Unit (ECU) to select and further switch/migrate operating models based on the vehicle load, driving conditions and gradient wherein each of the particular operating mode corresponds to a predefined effective/ optimized values of the rail pressure, fuel injection quantity and injection timing to enhance fuel economy and vehicle performance irrespective of diverse and variable load, road and other driving condition of the vehicle.

In yet another aspect of the invention the vehicle load and gradient sensors provide inputs to the vehicle controller which has embedded logic for the selection mode. The vehicle controller triggers the Electronic Control Unit (ECU) of engine to select the appropriate operating mode from multiple inputs. The diverse modes correspond to the one or combination of driving conditions, road condition, gradient and load on the vehicle.

Thus in accordance with the invention the multiple mode control system for a vehicle comprises of a vehicle control unit that is operably configured with manual override switch (50), one or plurality of sensors, audio output means (80) and ECU; the vehicle control unit comprising processor configured with Read Only Memory (ROM), Random Access Memory (RAM), analog to digital converter, switch driver and an optional communication engine and hard disk drive; wherein an engine of the vehicle that is configured with ECU.

In another aspect of the invention the multiple mode control system for a vehicle comprising a vehicle control unit is operably configured with manual override switch (50), one or plurality of sensors, audio output means (80) and ECU; the vehicle control unit comprising processor configured with Read Only Memory (ROM), Random Access Memory (RAM), analog to digital converter, switch driver and an optional communication engine and hard disk drive;
wherein the vehicle control unit is characterized in
   acquiring input signal from one or plurality of sensors relating to load, road gradient, road condition, vehicle condition but not limited to it;
   processing the input signals and data, correlating it with the pre-loaded performance maps and arrive at/selecting the most effective operating mode in the vehicle controller;
   checking for manual override command by the vehicle control unit;
   sending the output signal of the selected optimum operating mode to ECU (20) and providing audio output signal by the vehicle control unit;
   receiving signal relating to the selection of specific operating mode in the ECU by the vehicle control unit:
   activating specific operating mode in the ECU (20) that is configured with an engine (10) of the vehicle wherein the said specific operating mode activates a set of parameters such as rail pressure, injection quantity and injection timing specific to operating modes.

BRIEF DESCRIPTION OF THE DRAWINGS

Features and advantages of this invention will become apparent in the following detailed description and the preferred embodiments with reference to the accompanying drawings. The embodiments are illustrated by way of example and not by way of limitation in the figures of the accompanying drawings.

Explanation of Term: A mode in the context of the present invention corresponds to a set of parameters such as rail pressure, injection quantity, injection time, ET, FMTC (but not limited to it) wherein the mode is a function of the gradient, driving conditions, vehicle load (but not limited to it).

DETAILED DESCRIPTION OF THE INVENTION

The automated system of the present invention comprises a vehicle controller/control unit with embedded logic that takes inputs from load and gradient sensors. The vehicle controller of the present system of the invention automatically triggers the Electronic Control Unit (ECU) to switch/migrate over operating modes, based on the vehicle operating conditions. Three sets of parameters namely rail pressure; injection quantity and injection timing are integrated in electronic control unit (ECU) of the engine. Each set of the said parameters are specific for the each individual operating mode and the automated selection of the appropriate operating mode provides the best optimized fuel economy and vehicle performance.

Figure 1:
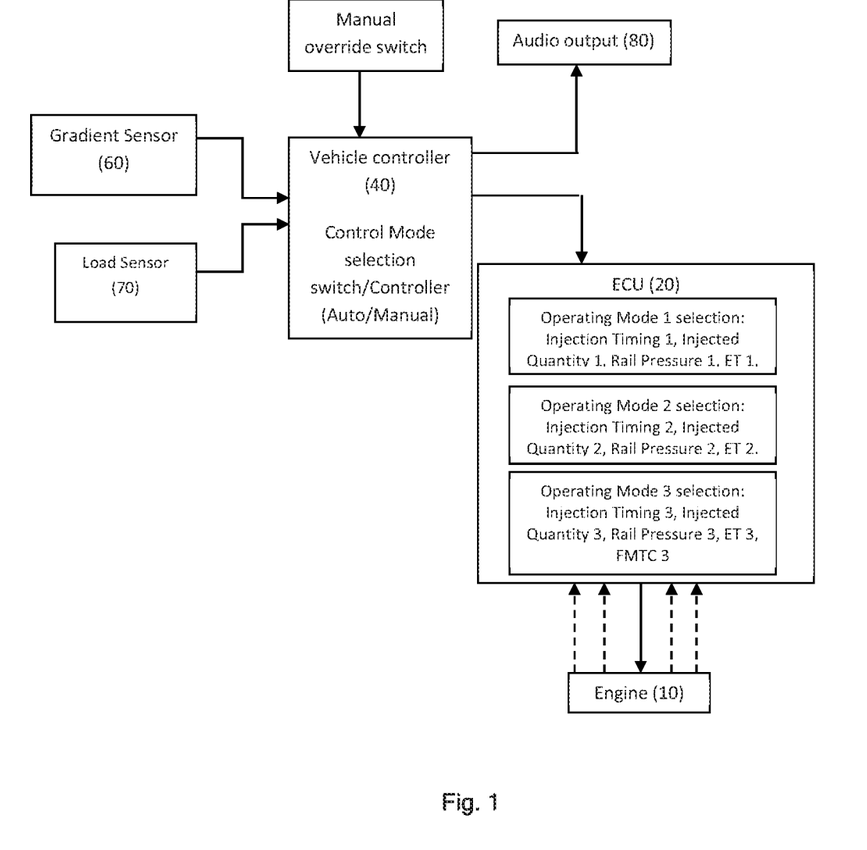
FIG. 1 illustrates a block diagram of a mode selected switching control system for a vehicle in accordance with the present invention (Sheet 1).

The schematic of the system is depicted in FIG. 1. The system comprises of an engine (10) of the vehicle that is configured with ECU (20). The vehicle controller/control unit (40) is operably configured with manual override switch (50), gradient sensor (60), load sensor (70), audio output means (80) and ECU (20).

Figure 1A:
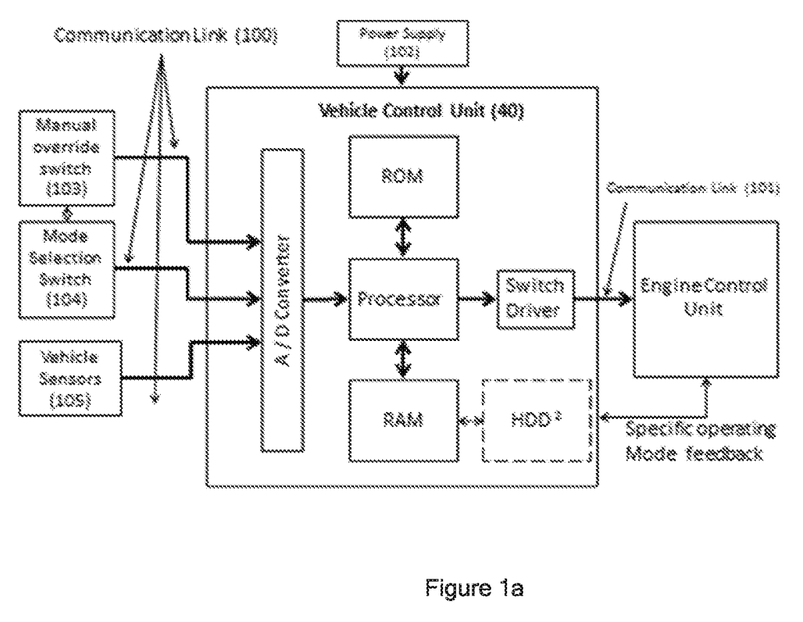
FIG. 1a illustrates schematic of the vehicle control unit and its configuration with other components.

As depicted in FIG. 1a, the vehicle control unit (40) comprises of a processor configured with Read Only Memory (ROM), Random Access Memory (RAM), analog to digital converter, switch driver and an optional communication engine and hard disk drive. The said vehicle control unit (40) is configured with the engine control unit (20) and manual override switch (103), mode selection switch (104) and one or plurality of sensors (105). The communication protocol (100 and 101) for the configuration is in the form of wired or wireless connections. In one of the embodiments the control unit, manual switch, mode selection switch, and sensors are configured using communication, protocol selected from CAN, RFID, WAN, Wired, SENT, LIN, Flexray, Infrared, Bluetooth, RS 232, RS485, TCP/IP.

In the context of the present invention the migration between modes is achieved by a process of switching, either automatic or manual in such a way that the transition time t' can be varied so that the transition is seamless/smooth to avoid any abruptness or jerks.

The system of the present operates in following steps:
   the vehicle controller/vehicle control unit (40) receives inputs from Load sensor (70), gradient sensor (60) and manual override switch (50) and communicates to ECU (20) that selects an appropriate operating mode for the best fuel efficiency and vehicle performance based on optimization of the three parameters namely rail pressure, injection timing and injection quantity. The ECU (20) also controls and monitors other parameters necessary for the function of the system;
   the ECU (20) communicates the selected operating mode together with the optimized parameters namely Rail pressure, Injection timing, injection quantity but not limited to it to the engine (10) to operate as per the selected mode;

the ECU provides inputs and controls the engine operation to ensure that it operates in the selected mode.

Vehicle load and gradient sensors provide inputs to a vehicle controller (40) which has embedded logic for the selection of mode. The vehicle controller triggers the Electronic Control Unit (ECU) of engine to select the appropriate operating mode from multiple inputs. The inputs from other sensors, engine speed, gear status, rail pressure, and accelerator pedal are also integrated as a particular mode gets activated. In one of the embodiments the system of the present invention is adapted to receive the signal/s from rain Sensor, Tire pressure, Brake position, Vehicle speed, Ambient Temp., Ambient Pressure, Gear Position, Fuel Level, Fuel Temp., Lambda sensor, NOx Sensor, Coolant Level, Oil Temp, Oil Press, Retarder, Boost Pressure, Boost Temp., Engine speed, GPS, Rail pressure, Injector needle lift, to achieve the same or similar output.

Each of the operating modes is dependent on independent sets of values of the parameters such as rail pressure, injection quantity of fuel and injection timing. These are integrated in the ECU of the engine. These sets of parameters namely rail pressure, injection quantity and injection timing are specific to a selection mode, and provide the best optimized fuel economy and vehicle performance.

Figure 2:
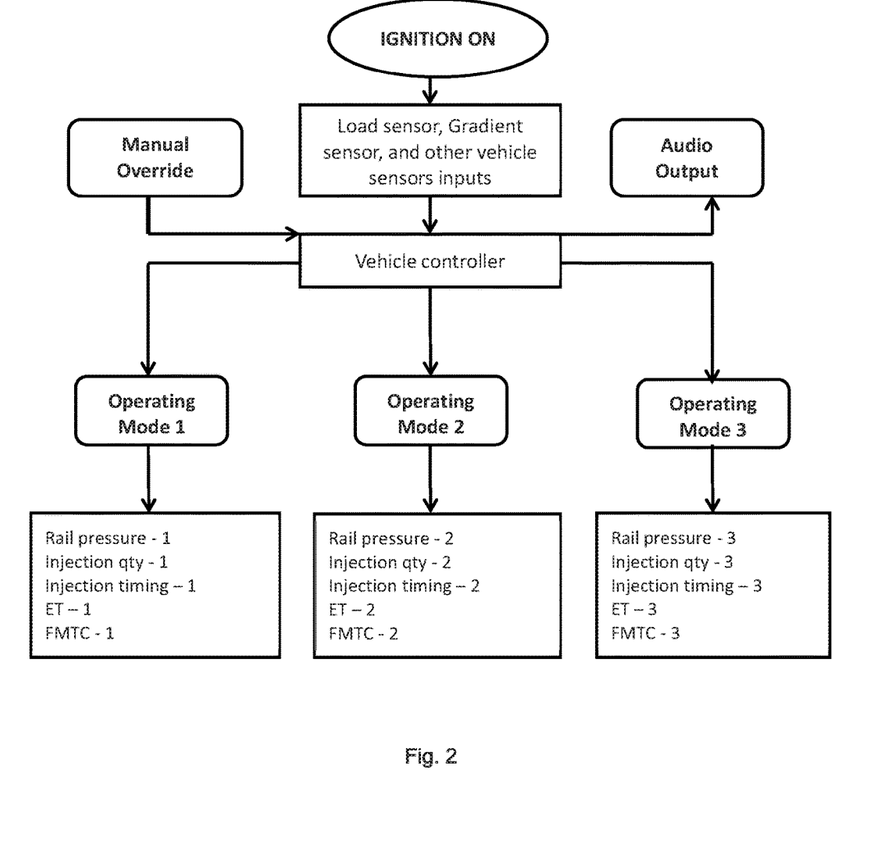
FIG. 2 illustrates working flowchart of the mode selected switching control system for vehicle in accordance with the present invention (Sheet 2).

The vehicle controller (40) is connected to a switch (50) which overrides the automatic control in the system in case of failure of the said inputs. Further, a driver may encounter an emergency situation in which the vehicle ought not to run in the automatically selected mode, he may override the system. The driver is periodically alerted that the vehicle is running in the "overriding mode" so that he can affect a changeover to the automatic mode at an appropriate time. Such overriding interventions are securely logged in the system that can be retrieved for routine monitoring. FIG. 2 illustrates the process comprising steps of:

Activating ignition to enable all sensors, actuators and controllers functionalise/operationalize;

Acquiring input signal from the Load sensor (70), Gradient sensor (60) and other vehicle sensors by the vehicle controller (40);

Processing the input signals and data, correlating it with the already present data performance maps and arrive at/selecting the most effective operating mode in the vehicle controller (40);

Checking for manual override command by the vehicle controller;

Sending the output signal of best operating mode (say 1, 2 or 3 in the context of this description. However there could be plurality of operating modes not limited to only 3) to ECU and providing audio output signal by the vehicle controller;

Receiving signal relating to the selection of specific operating mode in the ECU by the vehicle control unit (40);

Activating specific operating mode (say 1, 2 or 3) in the ECU;

Activating specific set of parameters such as rail pressure, injection quantity and injection timing specific to operating mode 1, 2 or 3;

In one of the embodiments, the said specific set of parameters comprises of ET and FMTC as depicted in FIG. 2

Selecting the mode of operation based on vehicle requirements in the form of automatic control or override switch input;

Displaying the indication in the form visible display on the vehicle controller board as per the said input;

Processing the parameters (as per the mode selection) in the ECU to select the predefined fuel quantity, rail pressure and injection timing;

Sending the signal from ECU to actuate the engine common rail and injector to supply the selected quantity of fuel at specified timing with specified pressure to the engine to operate as per the selected migrated mode.

Figure 2A:
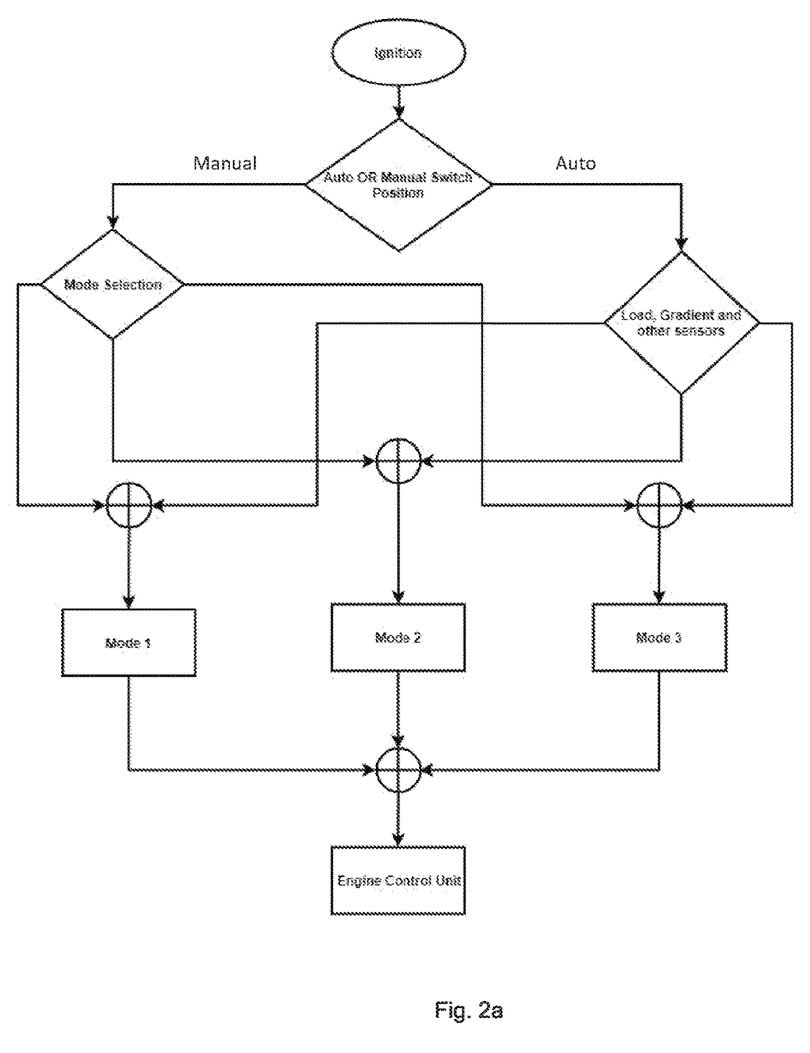
FIG. 2a and FIG. 2b illustrate logic of the method of working of the system (Sheet 4 and Sheet 5).
Figure 2B:
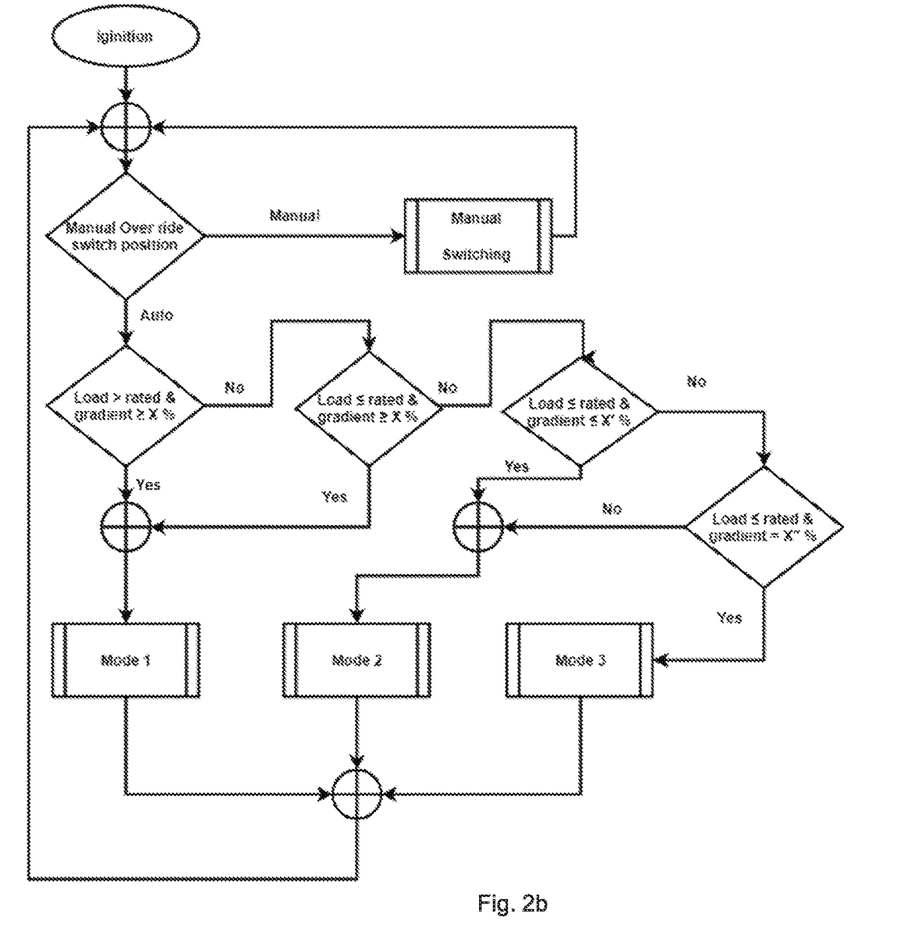

FIG. 2*a* and FIG. 2*cb* depicts the logic of the method of working/operation to enable appropriate mode selection. As depicted in FIG. 2*b* provides the flow chart of the process that comprises of:

Initiating ignition and selecting auto or manual switch position;

The manual switch selection enables (the user/operator) mode selection from either of the modes viz. mode 1, mode 2, mode 3, mode n The auto switch selection enables capturing signals from diverse sensors and selection of the appropriate mode using the said vehicle control unit (40)

The input from the said vehicle control unit (40) is provided to ECU (20) to operate the engine accordingly.

Based on the said flow chart depicted in FIG. 2*b*, the logic of operation is illustrated in FIG. 2*c*. The input parameters relating to the load on the vehicle and gradient are considered for this illustration. It is to be noted that however, the invention is not limited by this parameter. There could be plurality of other input parameters. As depicted in FIG. 2*c*, there is a decision between manual or auto switching. If the auto switching is selected, the signal from load (on the vehicle) and the gradient is monitored on the real time basis to arrive at the decision of the appropriate mode. For example, load monitoring is done every 60 minutes, gradient is monitored every 100 ms; it is to be noted that the time-interval to acquire the signals of these parameters could be pre-defined independently. The appropriate mode out of the three modes, is a function of the load and the gradient as indicated in the Table A. The load is categorised in overload, rated load and unladen based on the defined value of the load. The extent of gradient is also defined based on the predefined value (x) of the gradient. For example, if the load is less than or equal to the rated load and gradient is more than defined (X %), that is the gradient is steep; then the mode 1 is selected. If there is no gradient and the load is less than rated load, mode 3 is selected.

Figure 3:
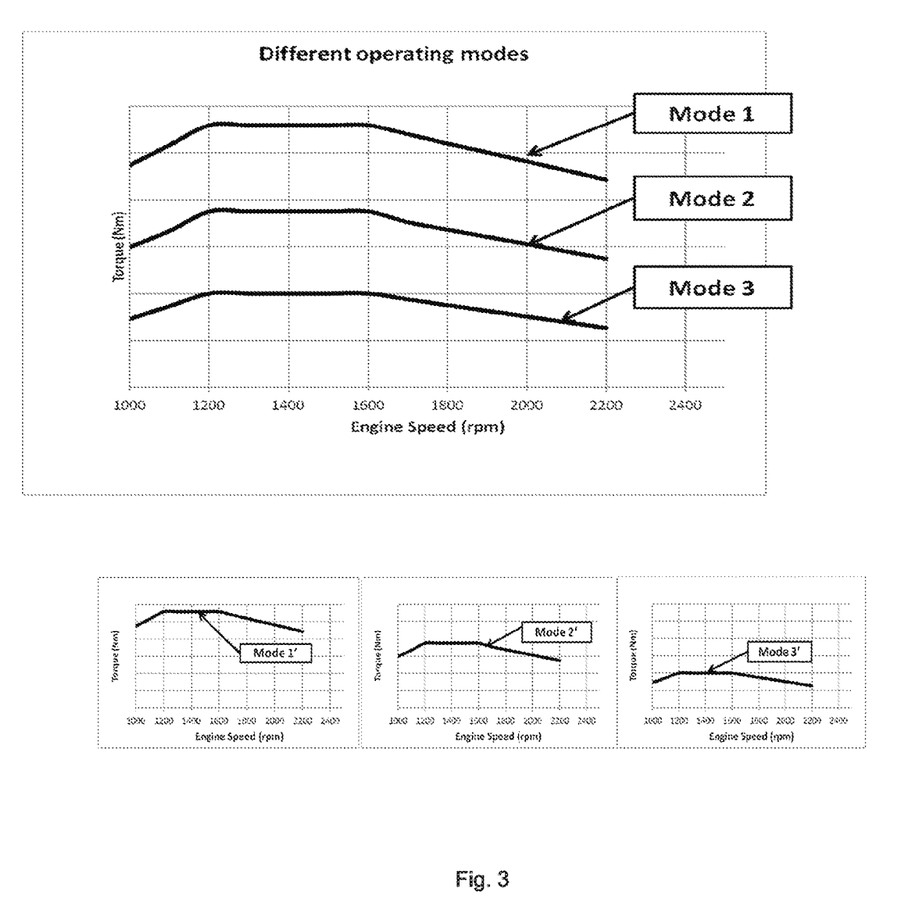
FIG. 3 illustrates the different operating modes of a vehicle as per the present invention (Sheet 6).

FIG. 3 illustrates the engine output curves (RPM vs. Torque) in all operating modes 1, 2 and 3 in accordance with the present invention along with its corresponding operating mode 1', 2' and 3' specific for the Rail pressure, Injection timing & injection quantity parameters.

In one of the embodiments, audio input is provided to the driver to manually select the appropriate operating mode determined by the system.

In another embodiment, the vehicle is selected from a compression ignition or spark ignition vehicle. In yet another variant of the embodiment, the vehicle is selected from hybrid, hydrogen fuel driven, conventional.

In another embodiment the vehicle is selected from the category of commercial, light commercial, passenger that includes sports utility vehicle and therelike.

In another embodiment, the inputs to the vehicle controller for the automatic selection of mode are provided using a global positioning system.

In another embodiment, inputs to the vehicle controller for the automatic selection of mode are provided from pre-loaded data for the routes and road conditions stored in the system.

In another embodiment inputs to the vehicle controller for the automatic selection of mode is provided from the driver's input for the road gradient and load carried in vehicle.

In another embodiment the system has inbuilt operating tolerance of 10% of the selected operating mode.

It is evident that the synergistic integration and configuration of the vehicle controller (40) with the sensors to acquire diverse inputs related to load, vehicle driving conditions and road and further with the ECU to enable selection and switching of the effective operating mode provides enhanced fuel economy and vehicle performance. The system of the present invention results in following advantages as follows:

- Independent of the driver's understanding or competence, the system automatically triggers the ECU to switch over the operating modes, based on the load and road conditions.
- Driver to driver variation affecting fuel economy is minimised.
- Fuel economy benefit is achieved in range of 6% to 10% over conventional systems.
- Better fuel economy optimization is achieved in operating zone of each mode by controlling rail pressure, injection quantity and injection timing.
- Vehicle can be run in different applications with optimized driveability.
- Flexibility to operate the vehicle in different terrain with optimized torque (traction) at wheel with single power train solution

EXAMPLE

The following example substantiate the aspect of the effective fuel economy and enhanced performance by virtue of using the system of the present invention and without using the system of the present invention is contemplated and compared.

The commercial vehicle type 25T GVW, powered by 260 hp engine is considered. Comparative trials under controlled driving conditions (varied load condition) were performed on different routes with varied gradients namely, steep, moderate and No gradient. The fuel consumption is measured while using the system of the present invention and without using the said system.

Differentiated performance is obtained by applying 3 modes in this example. The modes correspond to the loading condition and road gradient. It is depicted in Table 1. It is observed that there is about 5% fuel saving using the system of the present invention. There exists further scope to optimize the modes to enhance the fuel economy benefit (say ≥10%).

TABLE 1

Fuel Economy Performance Comparison

| Route Application | Steep gradients road | | Moderate gradient road | | No gradient road | |
|---|---|---|---|---|---|---|
| | Vehicle with invention | Vehicle without invention | Vehicle with invention | Vehicle without invention | Vehicle with invention | Vehicle without invention |
| Overload | At par | Base | 3.5% better | Base | 3% better | Base |
| better | | | | | | |
| Rated Load | At par | Base | 4.5% better | Base | 4% better | Base |
| Unladen (No load) | 3% better | Base | 5.5% better | Base | 5% better | Base |

The capability of the vehicle to negotiate different grades (expressed in) was tested under controlled conditions with 3 modes. The results are provided in Table 2.

TABLE 2

Gradient Negotiation Performance

| Sr No. | Parameters | Mode 1 | Mode 2 | Mode 3 |
|---|---|---|---|---|
| 1 | Stop-start - % @ 25T | 17.16 | 14.17 | 12.67 |
| 2 | Flying - % @ 25T | 24.58 | 22.12 | 17.99 |

The capability of the vehicle to accelerate from a speed of 0 km/h to 60 km/h in terms of time (sec) is tested with 3 modes under controlled conditions. The results are provided in Table 3.

TABLE 3

Acceleration Performance

| Sr No. | Parameters | Mode 1 | Mode 2 | Mode 3 |
|---|---|---|---|---|
| 1 | WOT 0-60 km/h time required sec @ 25T | 33.7 | 43.2 | 61 |

The capability of the vehicle to attain the max speed (km/h) with 3 modes under controlled conditions is tested, the results are provided in Table 4.

TABLE 4

Maximum Speed Performance

| Sr No. | Parameters | Mode 1 | Mode 2 | Mode 3 |
|---|---|---|---|---|
| 1 | Max Speed - km/h @ 25T | 104 | 102 | 89 |

We claim:

1. A multiple mode control system for a vehicle comprising:
   a manual override switch;
   a load sensor;
   a vehicle controller adapted to be in communication with said manual override switch, wherein said vehicle controller is configured to:
   receive an input from a driver for a load carried in said vehicle, a gear status sensor, pre-loaded data for routes, a global positioning system, the manual override switch and the load sensor; and an Electronic Control Unit (ECU) adapted to be in communication with said vehicle controller, wherein said Electronic Control Unit (ECU) is configured to:
select an operating mode from a plurality of operating modes in said vehicle controller based on said received input, wherein each of the said operating modes are dependent on independent predefined sets of values of fuel quantity, rail pressure, injection timing, Energizing Time (ET), Fuel Mass Torque Converter (FMTC);
activate said selected operating mode, thereby activating said fuel quantity, said rail pressure, said injection timing, said Energizing Time (ET), and said Fuel Mass Torque Converter (FMTC) corresponding to said selected operating mode.

2. The multiple mode control system as claimed in claim 1, wherein a communication between said Electronic Control Unit (ECU) and said vehicle controller is in the form of wired or wireless connections.

3. The multiple mode control system as claimed in claim 1, wherein said predefined sets of values of said fuel quantity, said rail pressure, said injection timing, said Energizing Time (ET), said Fuel Mass Torque Converter (FMTC) are integrated in said Electronic Control Unit (ECU).

4. The multiple mode control system as claimed in claim 1, wherein the vehicle is a compression ignition, spark ignition vehicle, hybrid, or hydrogen fuel driven vehicle.

5. A method of providing a multiple mode control for a vehicle, said method comprising:
receiving an input from a driver for a load carried in the vehicle, a gear status sensor, pre-loaded data for routes, a global positioning system, a manual override switch and a load sensor, by a vehicle controller;
selecting an operating mode from a plurality of operating modes in said vehicle controller based on said received input, wherein each of the said operating modes are dependent on independent predefined sets of values of fuel quantity, rail pressure, injection timing, Energizing Time (ET), Fuel Mass Torque Converter (FMTC), by an Electronic Control Unit (ECU);
activating said selected operating mode, thereby activating said fuel quantity, said rail pressure, said injection timing, said Energizing Time (ET), and said Fuel Mass Torque Converter corresponding to said selected operating mode, by said Electronic Control Unit (ECU).

* * * * *